United States Patent [19]

Handley et al.

[11] 4,331,178
[45] May 25, 1982

[54] CURB BOX FOR PLASTIC VALVE

[75] Inventors: Edward W. Handley, Jackson, Mich.; Robert C. Stewart, Worthington, Ohio

[73] Assignee: Handley Industries, Inc., Jackson, Mich.

[21] Appl. No.: 204,461

[22] Filed: Nov. 6, 1980

[51] Int. Cl.³ .................... F16K 5/00; F16K 31/00; F16K 37/00
[52] U.S. Cl. .................... 137/556.3; 137/366; 251/292; 251/293
[58] Field of Search ............... 251/292, 293; 137/368, 137/556, 556.3, 366

[56] References Cited

U.S. PATENT DOCUMENTS

| 1,181,565 | 5/1916 | Block | 251/293 |
| 3,548,864 | 12/1970 | Handley et al. | 137/364 |
| 3,601,143 | 8/1971 | Glennon | 137/364 |
| 3,901,271 | 8/1975 | Stewart | 137/364 |
| 4,030,519 | 6/1977 | Zinn | 137/364 |
| 4,030,696 | 6/1977 | Bake et al. | 251/288 |
| 4,036,249 | 7/1977 | Perry, Sr. et al. | 137/556.3 |

Primary Examiner—A. Michael Chambers
Attorney, Agent, or Firm—Beaman & Beaman

[57] ABSTRACT

The invention pertains to a synthetic plastic underground valve curb box utilizing a removable base which may be assembled to the primary curb box casing by a "snap-on" motion, and wherein the curb box supports and encompasses a synthetic plastic service valve and holds the valve in a firm manner preventing the valve from twisting or disorienting itself relative to the curb box. Further, the valve employs an operating head capable of accommodating the two primary types of operating wrenches, and the valve head cleans itself of foreign matter.

6 Claims, 10 Drawing Figures

CURB BOX FOR PLASTIC VALVE

BACKGROUND OF THE INVENTION

Subterranean service lines for gas and water normally utilize a curb box to provide access to the service line valve, and such curb boxes include a tubular casing having a lower bell housing for encompassing the service line valve. The upper end of the curb box includes a cover, and removal of the cover permits a wrench to be lowered into the curb box for actuating the valve operator head mounted upon the valve body. An example of a synthetic plastic curb box is shown in the assignee's U.S. Pat. No. 2,931,383.

The housing located at the lower end of the curb box is provided with an open end which is inserted over the service line valve, and the valve, and conduit, normally lie on the bottom of the trench receiving the conduit. It is now common practice to utilize synthetic plastic conduit as a service line for natural gas, and as such plastic conduit is transported and handled as a coil the laying of the conduit in a trench often results in the conduit tending to twist or otherwise misalign itself relative to the trench due to stresses in the conduit material produced during manufacture, or resulting from coiling. Accordingly, the difficulty in maintaining a given orientation of the conduit within the trench complicates the angular positioning of the valve on the synthetic plastic service line, and difficulty is often encountered in properly aligning, and maintaining, the valve within the curb box lower housing.

In order to improve the support of the valve with respect to the curb box it is known to utilize base structure mounted on the lower end of the curb box housing upon which the valve rests, and curb boxes having bases are illustrated in the assignee's U.S. Pat. Nos. 3,548,864 and 3,901,271. In a recent development of the assignee a base is employed with a curb box wherein a "snap-on" interconnection between the curb box bell housing and base occurs, the base being particularly suitable for use with conventional metal valves, and such structure is shown in the assignee's patent application Ser. No. 128,633 filed Mar. 10, 1980.

While the past common practice has been to use metal service line valves with sythetic plastic service lines, service valves have now been developed for use with synthetic plastic service lines which are, themselves, of a synthetic plastic construction, which improves the longevity of the valve, renders the valve compatible with the gas line, is light weight and provides excellent resistance to corrosion over long periods of service. However, such synthetic plastic valves are of such configuration, often cylindrical, which does not lend itself to accurate and firm positioning within the valve housing, or upon the base.

Additionally, many synthetic plastic valves presently available use either one of two types of valve operators which require a special valve operator configuration, necessitating that the service crew carry both kinds of valve operating wrenches in that the particular type of wrench required is not known until the curb box is opened.

It is an object of the invention to provide a curb box for subterranean utility service lines wherein the curb box firmly supports and positions a service line valve upon a base to which the curb box casing and valve housing are readily attached.

A further object of the invention is to provide a curb box construction having a removable base wherein a cylindrical valve may be firmly supported in a predetermined orientation within the curb box, and torsion forces exerted on the valve by the service line are effectively resisted by the curb box structure.

Another object of the invention is to provide a valve operator head for curb box usage wherein a single valve head accomodates either of the two most commonly used valve operating wrenches eliminating the necessity for a service crew to carry both types of wrenches, and further, the valve operator head is self-cleaning with respect to foreign matter falling thereupon which may interfere with wrench operation.

In the practice of the invention the curb box casing includes a lower valve receiving bell housing wherein opposite sides of the housing are slotted in order to define a pair of cantilevered spring portions in which a pair of vertically spaced base engaging abutments are defined. The removable base includes edges which engage the casing housing abutments, and the horizontal length of the base is substantially greater than the width of the valve housing whereby the base provides a high degree of resistance to rotation of the curb box assembly.

Further, the base includes a cylindrical cradle portion at its central region for closely receiving a cylindrical service line valve, and the lower region of the base includes an opening which receives a downwardly extending sprue or projection formed on the valve whereby the close relationship of the base and valve provides firm support of the valve relative to the curb box, and prevents the curb box from twisting or otherwise angularly disorienting itself with respect to the curb box, assuring proper valve actuator operation throughout the life of the service line.

The valve operator head includes a body of a generally square configuration having upper surfaces which are inclined to the horizontal to readily shed foreign matter falling upon the head. Further, an upwardly extending elongated projection diagonally oriented upon the head permits either a slot type wrench, or a square socket type wrench to be used with the head for valve actuation purposes. The self-cleaning aspect of the head assures full and complete engagement of the valve wrench upon the valve actuating head.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
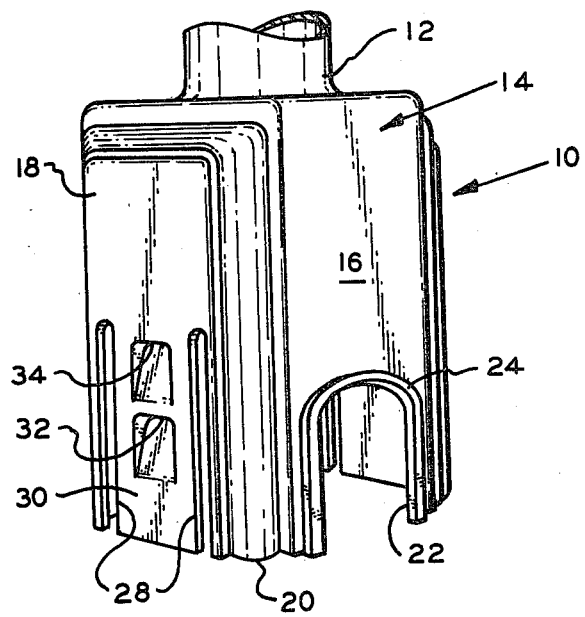
FIG. 1 is an exploded, perspective view of the invention illustrating the lower portion of the curb box and valve housing, curb box base and a synthetic plastic service line valve.
Figure 1:
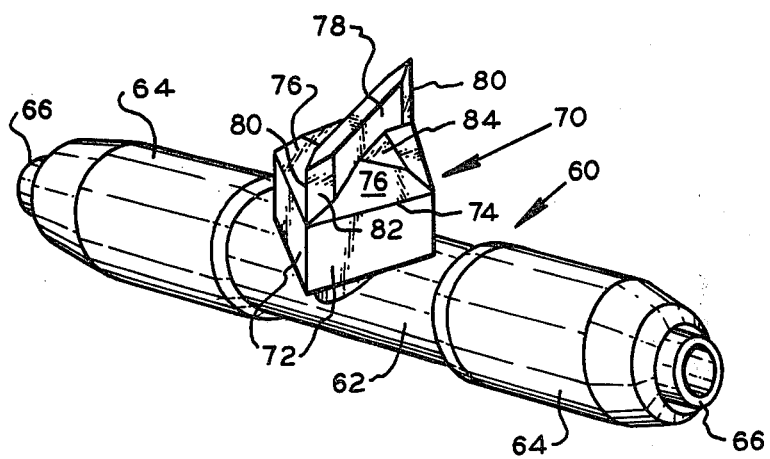
Figure 1:
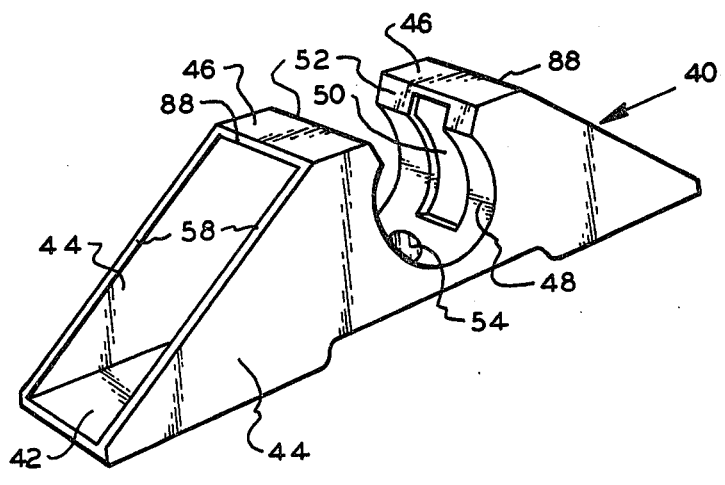

With reference to FIG. 1, the primary components of the invention will be apparent. The synthetic plastic curb box includes a casing generally indicated at 10 whose upper portion consists of a tubular cylindrical column or stem 12 which usually telescopingly engages with an upper curb box tube having a cap mounted thereon, such features constitute no part of the present invention, and are not shown.

The lower portion of the casing 10 includes the valve bell housing 14 which is of a generally rectangular configuration having pairs of lateral sides 16 and 18, and a lower edge 20 wherein the interior of the housing is accessible adjacent the lower edge.

The lateral sides 16 are each formed with an arch opening 22 which may be defined by a flange 24, the arch opening being of sufficient width to accomodate the valve with which the curb box is associated.

The housing lateral sides 18 may be formed with several configurations of embossments, and the sides are each slotted to the associated edge 20 to form parallel slots 28 extending upwardly, and the slots define a cantilevered flap or spring portion 30 from the material of the housing side 18. In each portion 30 a pair of base attaching hooks or abutments 32 and 34 are formed each consisting of an inner cam surface 36, and an abutment surface 38, abutments 32 and 34 being vertically spaced relative to each other in order to accomodate two sizes of bases.

The base 40 is also formed of a synthetic plastic material and the base comprises a bottom panel 42 from which rise a pair of substantially parallel walls 44. The walls 44 terminate at their upper regions in surfaces 46 which constitute locating surfaces for the valve operating wrench, as later described.

At the central region of the base 40 a cradle is defined consisting of a cylindrical segment wall 48 extending between the walls 44, and the cradle may be relieved at its central portion by openings 50. The flat angled surfaces 52 intersect the locating surfaces 46, and sufficient distance exists between the surfaces 52 to permit the valve operating structure to extend there between.

Figure 2:
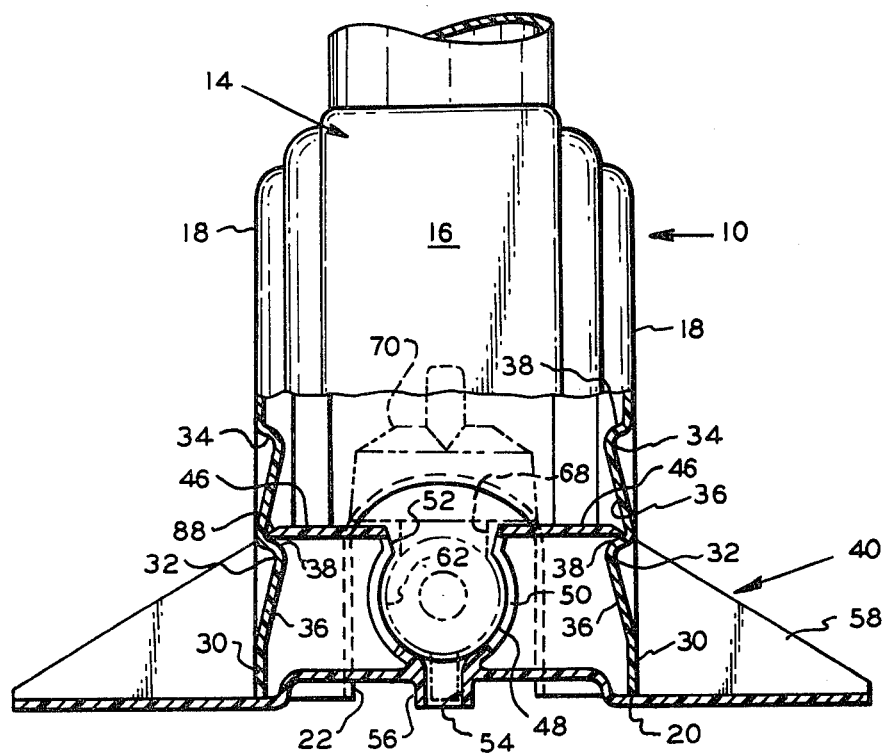
FIG. 2 is a side elevational view, partially sectioned, of the assembled curb box, the valve being shown in dotted lines.

At its lower portion the base cradle 48 includes a vertically oriented opening or bore, FIG. 2, 54 defined by tubular projection 56, and this bore receives a downwardly extending sprue or projection defined upon the valve. The walls 44 are obliquely formed at 58 whereby a substantial supporting surface is defined by the bottom panel 42, and earth received between the walls 44 will resist rotation of the assembled curb box and base.

The synthetic plastic service valve 60 utilized with the curb box structure of the invention is illustrated in FIG. 1, and includes a cylindrical valve body 62 having cylindrical conduit connections 64 formed on each end whereby the synthetic plastic gas line 66 may be connected to the ends of the valve in fluid tight relationship. The valve element within the bore of the valve 60 is of a spherical or ball type having a diametrical opening extending therethrough of a diameter equal to the valve passage, and rotation of the valve ball fully opens, or closes the valve passage. Rotation of the valve ball is accomplished through the valve shaft 68 upon which the valve operating head 70 is mounted.

The valve operating head 70 is of a generally square configuration having four vertically oriented sides 72 intersecting at 90° angles whereby the vertical projection of the head is square. The upper edge 74 of each of the sides is intersected by a head upper surface 76, and the head upper surfaces 76 each incline in an upper direction, FIG. 3, whereby foreign matter falling upon the head surfaces 76 will automatically fall from the head over the sides 72.

An elongated projection or ridge 78 arises from the head surfaces 76 extending in an upward direction, and the ends of the projection 78 are defined by apexes 80 formed by the intersection of surfaces 82. The apexes 80 coincide with the extension of the adjacent corners of the head as defined by two of the intersecting sides 72, and the vertical extension of the projection above the upper surfaces 76, and the horizontal surfaces 84 is sufficient to permit a wrench to be readily inserted over the projection 78.

Figure 3:
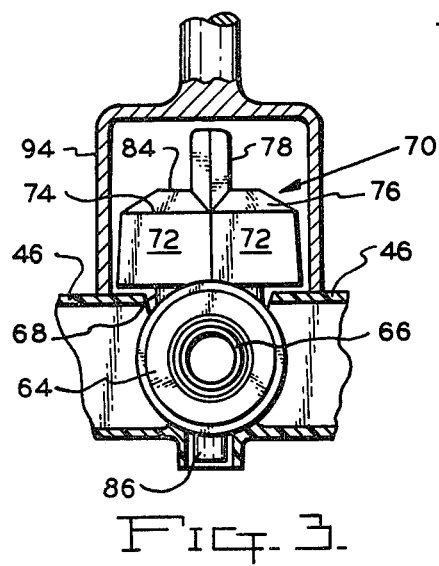
FIG. 3 is a detail, sectional view illustrating a valve within the curb box and a socket valve wrench located upon the valve actuating head resting upon the locating surfaces formed upon the base.
Figure 6:
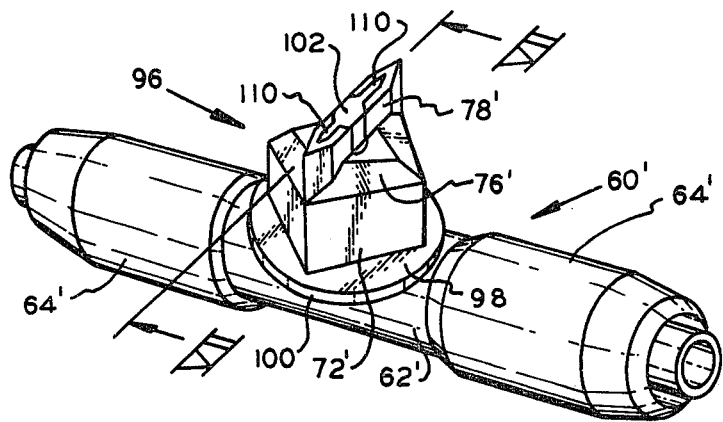
FIG. 6 is a perspective view of a valve having the preferred form of valve actuator mounted thereon.

In use, the base 40 is first mounted upon the valve 60 wherein the valve body 62 is snugly received within the base cradle portion 48. The assembly of the base and valve is possible due to the resiliency of the material of the base in that as the base surfaces 52 engage the valve body the valve body spreads the upper portion of the base sufficiently to permit the valve to be fully concentrically received within the cradle portion 48 as shown in FIGS. 2 and 3. The diameter of the cradle wall portion 48 substantially conforms to the diameter of the valve, and the downward extending valve sprue 86 is received within the base bore 54. The valve operating head 70 will be located above the base locating surfaces 46, as apparent in FIG. 3.

After the base and valve are assembled, the curb box housing 14 is inserted over the base and valve wherein the housing slots 28 receive the base walls 44, and as the housing is lowered upon the base the base location surface edges 88 engage the cam surfaces 36 spreading the housing portions 30 permitting the base edges 88 to engage the abutment surfaces 38 of abutment 32 upon alignment therewith, as shown in FIG. 2. The resilient nature of the wall portions 30 permits the wall portions to snap inwardly after passing over the base edges 88, and the base and housing are firmly interconnected merely by pushing the housing 14 downwardly upon the base 40.

The trench in which the service line and curb box are located may now be backfilled, and the support provided by the base 40 aids in orienting the curb box during backfilling. Earth received between the base walls 44 will aid in resisting rotation of the curb box, as does the rectangular configuration of the housing 14, and the curb box will adequately resist torque forces imposed thereon by the associated service line.

When it is desired to open or close the valve 60 the cover of the curb box, not shown, is removed and a wrench is lowered into the curb box through the column 12 for engagement with the valve actuator head 70. If the valve wrench is of the type shown in FIG. 4 the valve wrench socket 90 is readily placed upon the projection 78, and rests upon the valve head surfaces 84, the valve wrench opening 92 receiving the projection permitting torque forces to be applied to the head 70 for valve actuation purposes.

Figures 4, 5:
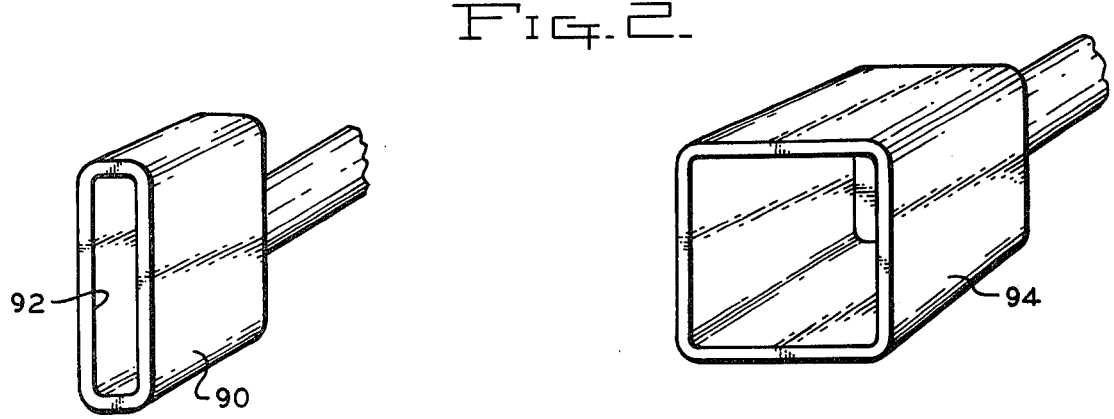
FIG. 4 is a perspective view of one type of valve actuation wrench.
FIG. 5 is a perspective view of a square socket type of valve actuation wrench.

If the service line crew has a square socket wrench of the configuration of FIG. 5 wherein the socket 94 is of a square configuration slightly larger than the square defined by the valve head sides 72 the wrench is placed over the head 70 as shown in FIG. 3 and rests upon the base surfaces 46. Rotation of the wrench will rotate the valve head as desired.

While the previously described valve actuator head 70 functions well an improved valve actuator head 96 is illustrated in FIGS. 6-9 which is employed in most commercial embodiments of the invention. In most respects the valve actuator head 96 incorporates identical features to those previously described, and identical components previously discussed are indicated by primed reference numerals.

The valve actuator head 96 is basically of a square configuration having flat sides 72', upper surfaces 76', and upstanding diagonally disposed elongated projection 78'. The head 96 includes a circular skirt 98 homogeneously defined on the head 96 of the material thereof and radially extending with respect to the head axis. The skirt is radially defined by a circular periphery 100, and the upper and lower surfaces of the skirt are planar.

It is important that the orientation of the valve actuator head 96 with respect to the valve body 62' be readily determinable when observed through the curb box, and for this purpose an insert 102 is located within a complementary shaped recess 103 defined in the head projection 78'. The insert 102 is formed of a synthetic plastic material of a different color than the head 96 and projection 78'. For instance, in the commercial form, the head and projection are orange, while the insert 102 is white.

Figure 7:
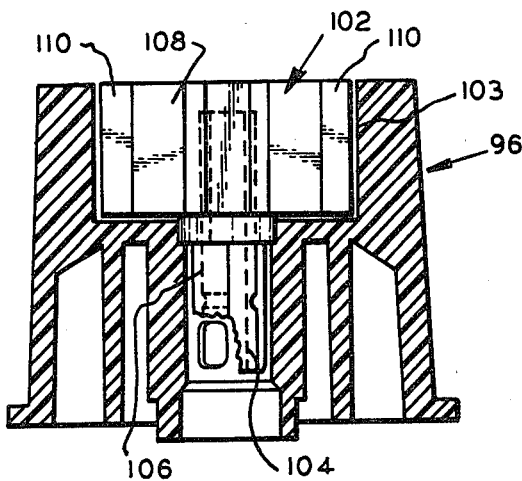
FIG. 7 is an elevational sectional view taken through the valve actuator along Section VII—VII of FIG. 6.

The insert 102 includes a stem 104 centrally received within the head 96, FIG. 7, and the stem bore 106 receives the valve stem. The insert 102 includes an upper flat portion 108 upon which elongated pointed portions 110 are formed, and as the upper surface of the pointed portions 110 intersect the top of the projection 78' the portions 110 are readily visible when the valve assembly is viewed from above through the curb box, and the orientation of the actuator head 96 is easily determined. By forming the insert 102 of a separate material than the head 96 the increased visibility provided by the insert 102 will not decrease with age, or be otherwise diminished.

Figure 8:
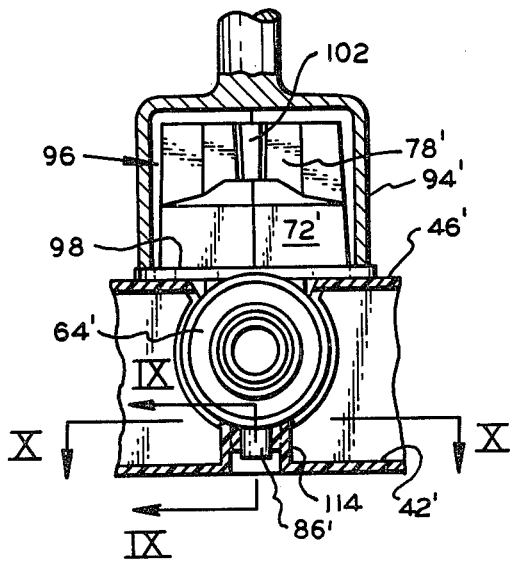
FIG. 8 is a detail, sectional view similar to FIG. 3 illustrating the relationship of a socket valve wrench with the valve actuator of FIGS. 6 and 7 during operation of the valve actuator.

As viewed in FIG. 8, the underside of the skirt 98 engages the base locating surfaces 46', and this engagement helps to stabilize the valve assembly 60' with respect to the base. When the socket 94' is placed over the head 96, FIG. 3, the lower edge of the socket will engage the upper surface of the skirt 98, and it will therefore be appreciated that the skirt protects the valve from possible damage by the wrench socket.

Another advantage deriving from the use of the skirt 98 results from the fact that the skirt 98 overlies the base cavity 48 and prevents stones and foreign matter from becoming lodged below the head 96 and possibly interfering with valve actuator head operation.

Figure 9:
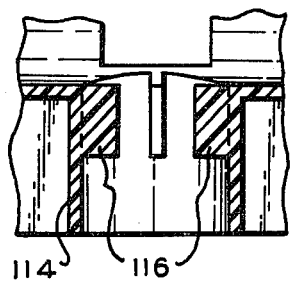
FIG. 9 is an elevational, sectional, enlarged detail view of the base sprue receiving opening as taken along Section IX—IX of FIG. 8.
Figure 10:
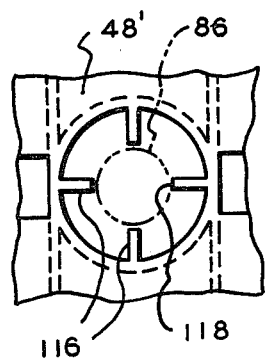
FIG. 10 is an enlarged, detail, plan sectional view of the valve projection receiving opening as taken along Section X—X of FIG. 8.

FIGS. 9 and 10 are directed to another form of base projection and bore for receiving the valve sprue 86'. In this embodiment the base projection 114 is of a circular nature and the internal bore thereof is provided with four radially inwardly projecting ribs 116 each having an end 118. The sprue 86' is located intermediate the ends of the ribs, as shown in dotted lines in FIG. 10. This construction of the projection 114 minimizes the possibility of the projection bore becoming clogged with dirt prior to assembly of the valve within the base, and this configuration also has manufacturing advantages.

It is possible to utilize the housing 14 with bases of greater vertical dimension than that illustrated, and for this purpose the upper abutments 34 are formed into the housing wall portion 30, and the operation and cooperation with the base will be identical with that previously described.

By utilizing valve actuator heads 70 and 96, as shown, the valve may be operated regardless of whether the service crew has a wrench of the type shown in FIG. 4, or FIG. 5, and the self-cleaning feature of the heads 70 and 96 will assure full engagement between the wrench and the valve head preventing damage to the valve.

It will be appreciated that the inventive concepts of the disclosed curb box structure permits synthetic plastic service line valves to be firmly supported upon the curb box structure having a removable base, and the disclosed structure minimizes many of the problems previously encountered when installing gas line employing synthetic plastic conduit.

It is appreciated that various modifications to the inventive concepts may be apparent to those skilled in the art without departing from the spirit and scope of the invention.

We claim:

1. A valve operator head for a subterranean valve having an upwardly disposed valve operating shaft, said head comprising a body having four vertically disposed flat side surfaces intersecting the adjacent side surfaces at 90° to define a square configuration, each side surface having an upper edge, a plurality of upper surfaces defined on said body each intersecting a side upper edge through the length of the intersected edge, said upper surfaces each being inclined upwardly from the intersected side upper edge, and a vertically extending elongated projection defined on said body extending upwardly from said upper surfaces and diagonally oriented on said body with respect to the square plan configuration thereof.

2. In a valve operator head as in claim 1, said projection having ends, each end terminating in an apex coinciding with a body corner as defined by intersecting side surfaces.

3. In a valve operator head as in claim 1, said vertically extending elongated projection having an upper surface defined thereon, and indicia means located upon said projection upper surface.

4. In a valve operator head as in claim 3, an insert located within said vertically extending elongated projection intersecting said projection upper surface, said insert being formed of a separate material with respect to said head and projection, and said insert having a color contrasting to the color of said projection wherein said insert defines said indicia means.

5. In a valve operator head as in claim 1, said head including a lower portion, a homogeneous radially extending skirt defined upon said head extending from said lower region, said skirt extending radially beyond said body side surfaces.

6. In a valve operator head as in claim 5, said skirt having a circular periphery.

* * * * *